CORRECTIVE CIRCUITS FOR AMPLIFIERS

Filed Nov. 1, 1954

INVENTORS
GARDNER P. WILSON
KEITH O. TIMOTHY
BY
Christie, Parker & Hale
ATTORNEYS United States Patent Office 2,924,781

Patented Feb. 9, 1960

2,924,781

CORRECTIVE CIRCUITS FOR AMPLIFIERS

Gardner P. Wilson, Pasadena, and Keith O. Timothy, Sierra Madre, Calif., assignors, by mesne assignments, to Consolidated Electrodynamics Corporation, Pasadena, Calif., a corporation of California Application November 1, 1954, Serial No. 466,157

4 Claims. (Cl. 330—104)

This invention relates to circuits for improving the frequency response of amplifiers, and it has particular reference to circuits which compensate for the damping effects in feedback circuits which are caused by distributed capacity.

Negative feedback is frequently employed in amplifiers to improve the frequency response of the stages of the amplifier across which the feedback is applied. However, such feedback does not compensate for the damping effects of distributed capacity in the feedback circuit itself, and hence the frequency response of the amplifier is limited as a result of the distributed capacity which is inherent in the feedback circuit.

This difficulty is overcome in the present invention by providing a corrective signal from one of the stages of the amplifier to the feedback circuit which cancels the capacitive component which tends to be caused in the feedback signal due to the distributed capacity of the electrical circuit for the feedback signal.

In accordance with a preferred embodiment of the present invention, negative voltage feedback is provided at the input of the amplifier and the effects of distributed capacity upon the feedback signal are compensated for by providing a corrective signal to the input circuit of the amplifier having a phase which is approximately 180° with respect to and having a magnitude which is approximately equal to the capacitive component which tends to be caused in the feedback signal due to the distributed capacity of the feedback circuit. Ordinarily, the corrective signal is a positive feedback signal which is applied to the input of the amplifier through a condenser. The capacity of the condenser and the magnitude of the corrective feedback signal are proportioned so that the corrective signal which is produced at the input circuit cancels out the capacitive component which tends to be caused in the feedback signal as a result of distributed capacity.

The invention is explained in more detail with references to the drawings, in which.

Figure 1:
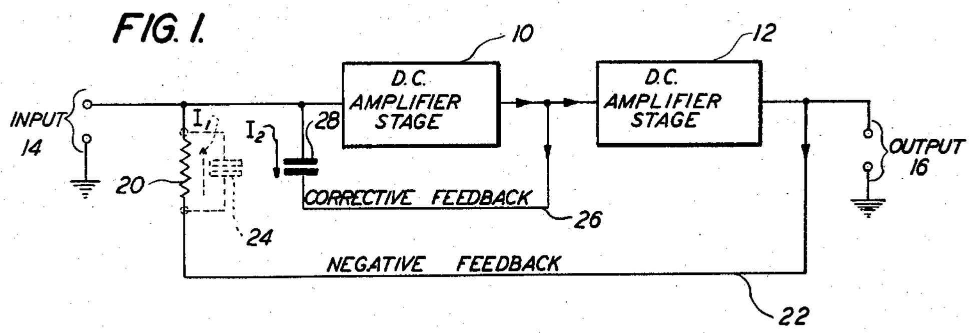
Fig. 1 is a block diagram showing the corrective circuit of the present invention.

Fig. 1 shows a direct current amplifier arrangement wherein a pair of amplifier stages 10 and 12 are provided with an input circuit 14 and an output circuit 16. The amplifier stages 10 and 12 are ordinarily the individual stages of a single amplifier. They are shown as separate units in the drawing in order to illustrate the negative and corrective feedback circuits.

A grid leak resistor 20 is located in the input circuit of the amplifier. Negative voltage feedback is provided at the output of the amplifier stage 12 and it is coupled through a lead 22 and the resistor 20 to the input of the amplifier stage 10.

The grid leak resistor 20 ordinarily has a large resistance, say of the order of $10^{10}$ ohms. The resistor 20 and the electrical parts which are associated with it have some distributed capacity which is inherent. This capacity is illustrated by the condenser 24 which is shown in dashed lines in the drawing. A capacitive component tends to be caused in the feedback signal due to this distributed capacity. The distributed capacity causes a rate-of-change feedback to the input of the amplifier, and hence the distributed capacity produces a damping effect which limits the frequency response of the amplifier.

In order to compensate for the effects of the distributed capacity upon the negative feedback signal, a corrective feedback signal is obtained from the output of the amplifier stage 10 and coupled through a lead 26 to one terminal of a condenser 28. The other terminal of the condenser 28 is connected to the input of the amplifier stage 10. The capacity of the condenser 28 and the magnitude of the signal which is applied to it through the corrective feedback lead 26 are proportioned so that the magnitude of the current $I_2$ which flows through the corrective feedback condenser 28 is equal to the magnitude of the current $I_1$ which tends to be caused by the distributed capacity.

The corrective feedback signal is derived from a location in the amplification system such that the corrective feedback signal is 180° out of phase with respect to the negative feedback signal. Thus, the corrective current $I_2$ which is conveyed through the condenser 28 is 180° out of phase with respect to the current $I_1$ which is caused by distributed capacity effects, so that substantially complete cancellation is effected.

Figure 2:
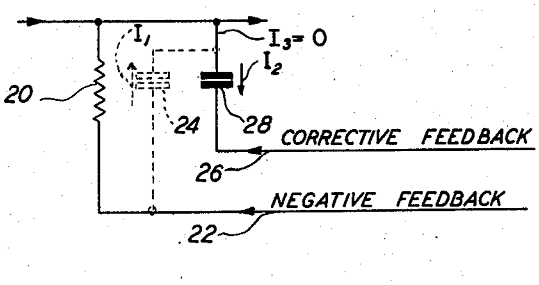
Fig. 2 illustrates the capacitive currents which flow in the apparatus of Fig. 1.

This aspect of the corrective feedback circuit is illustrated in Fig. 2 wherein the distributed capacity 24 is shown connected between one terminal of the condenser 28 and the negative feedback lead 22. When the capacitive currents $I_1$ and $I_2$ are of equal magnitude, the combined capacitive current $I_3$ is zero.

Figure 3:
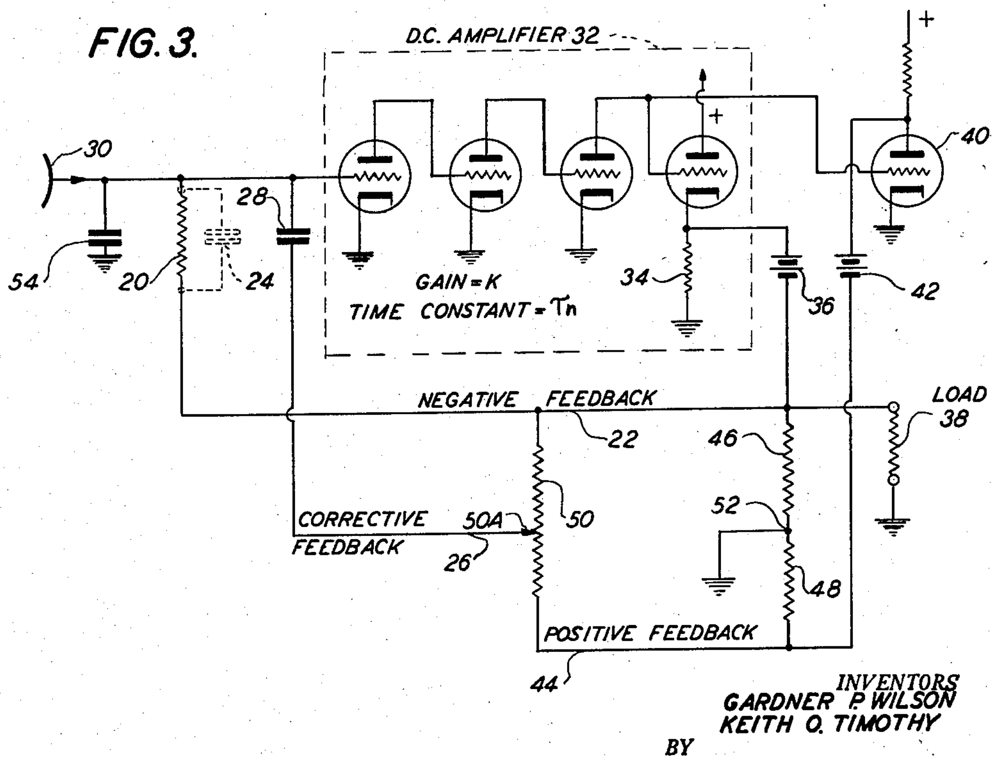
Fig. 3 is a schematic diagram illustrating one form of the corrective circuit.

Fig. 3 shows how the corrective circuit of the invention may be employed in an electrometer amplifier such as might be employed at the collector electrode 30 of a mass spectrometer for providing an output signal which is representative of the number of ions which impinge upon the collector electrode.

A direct current amplifier 32 having four amplification stages is illustrated. The details of the electrical circuit for the direct current amplifier are not shown since such amplification systems are conventional and may take numerous forms.

The output signal of the amplifier is developed across a cathode resistor 34 in the last stage of the amplifier. This signal is applied through a source of potential 36 to a load resistor 38, with the source of potential 36 having a voltage which bucks out the steady state signal developed across the cathode resistor 34 so that the signal developed across the load resistor is zero when the signal at the input circuit is zero.

The signal which is developed across the load resistor is employed as the negative feedback signal, and it is applied over the lead 22 and the resistor 20 to the input of the amplifier.

An inverter such as a vacuum tube 40 is provided for developing a signal which is 180° out of phase with respect to the negative feedback signal. The grid of this amplifier tube is connected to the grid of the last tube of the direct current amplifier 32, and the output signal which is developed in its plate circuit is 180° out of phase with respect to the signal which is developed across the cathode resistor 34 of the last tube of the direct current amplifier. The signal which is produced by the tube 40 is connected through a source of potential 42 to a positive feedback circuit 44. The voltage of the source of potential 42 has a magnitude which bucks out the steady state voltage developed at the plate of the tube 40 so that the positive feedback signal is zero when no signal is applied to the input circuit of the direct current amplifier 32.

The negative and positive feedback signals are applied across two opposite terminals of a bridge circuit. The bridge circuit comprises a pair of arms 46 and 48 having fixed resistance, and a potentiometer 50 having an adjustable tap 50A. The corrective feedback signal which is produced between the adjustable tap 50A of the potentiometer and the junction 52 between the other two arms of the bridge circuit is applied through the condenser 28 to the input of the direct current amplifier. Thus, the magnitude of the corrective feed-back signal can be adjusted by moving the adjustable tap 50A of the potentiometer.

A condenser 54 is shown coupled between the input of the direct current amplifier and ground. This condenser is desirable in some applications in order to provide proper damping at the input circuit of the direct current amplifier.

If the arm 50A of the potentiometer is at the maximum negative position, and if the distributed capacity 24 is small compared to the capacity of the condensers 28 and 54, the per unit damping will be maximum. It may be expressed as follows:

$$h=\frac{\frac{\tau n}{RK}+\frac{C_{28}+C_{54}}{K}-C_{28}}{2\sqrt{\frac{\tau n(C_{28}+C_{54})}{-RK}}}$$

which reduces to $$h\cong\frac{C_{28}RWn}{2}$$

where $h$ is the per unit damping, $\tau n$ is the time constant of the amplifier, K is the gain of the amplifier, R is the resistance of the resistor 20, $C_{28}$ and $C_{54}$ are the capacities of the condensers 28 and 54, and $Wn$ is the natural frequency of the system which is equal to $$\sqrt{\frac{-K}{R(C_{28}+C_{54})\tau n}}$$

Minimum per unit damping, assuming no corrective feedback signal, occurs when the arm 50A of the potentiometer is at its midpoint, and the only capacitive feedback becomes that through the distributed capacity 24. This condition may be expressed as follows:

$$h_{\min}=\frac{RC_{24}Wn}{2}$$

Thus, the minimum response time of the system for a fixed $Wn$ will be obtained by a given value for the grid leak resistor 20 and its distributed capacity 24.

By applying a positive feedback signal to the bridge circuit and adjusting the arm 50A of the potentiometer 50 to the positive feedback side of the potentiometer, the corrective feedback can be adjusted to neutralize and cancel out the effects of the distributed capacity 24.

Thus, $h_{\min.}$ can be reduced almost to zero if desired, or with the other parameters fixed, the resistance of the resistor 20 can be made much larger for the same frequency response and damping.

We claim:

1. In an amplifier having negative voltage feedback applied through a resistor to one stage of the amplifier, means for compensating for the effects of the distributed capacity of the resistor and the associated electrical components upon the negative feedback signal so as to extend the frequency range of the amplifier, comprising an electric circuit coupled between one of the stages of the amplifier and the end of the resistor opposite that to which the negative feedback signal is applied for providing a corrective signal having a capacitive component which predominates, with the capacitive component of the corrective signal having a phase and a magnitude which substantially cancels the capacitive component which tends to be caused in the negative feedback signal due to distributed capacity.

2. In an amplifier including a negative feedback circuit, a resistor in the amplifier input circuit through which a negative feedback signal is applied to the input of the amplifier, means for compensating for the effects of distributed capacity upon the feedback signal so as to extend the frequency range of the amplifier, comprising an electrical circuit coupled between one of the stages of the amplifier and the end of the resistor which is coupled to the input of the amplifier for providing a corrective signal of the capacitive current having a phase which is approximately 180° with respect to and having a magnitude which is approximately equal to the capacitive component which tends to be caused in the feedback signal due to the distributed capacity of the resistor and the associated electrical components.

3. In a direct current amplifier having negative voltage feedback applied to its input circuit, means for compensating for the effects of distributed capacity upon the feedback signal so as to extend the frequency range of the amplifier, comprising a condenser having one terminal coupled to the input of the amplifier, and an electrical circuit coupled between one of the stages of the amplifier and the other terminal of the condenser for providing a corrective signal of capacitive current through the condenser to the input circuit having a phase which is approximately 180° with respect to and having a magnitude which is approximately equal to the magnitude of the capacitive component which tends to be caused in the feedback signal due to the distributed capacity of the electrical circuit through which the feedback signal is applied.

4. An electrometer amplifier circuit comprising a direct current amplifier having a grid leak resistor in its input circuit across which an input signal voltage is developed and through which negative voltage feedback is applied to the input of the amplifier, a condenser having one terminal coupled directly to the input of the amplifier, a bridge circuit having four resistor arms, means coupling positive and negative feedback signals from the amplifier to opposite terminals of the bridge circuit, and means coupling the signal produced between the other two terminals of the bridge circuit to the other terminal of the condenser to cancel the capacitive component which tends to be caused in the feedback signal due to the distributed capacity of the grid leak resistor and the associated electrical components, so as to extend the upper limit of the frequency range of the amplifier.

References Cited in the file of this patent

UNITED STATES PATENTS

| | | |
|---|---|---|
| 2,168,870 | Goodenough | Aug. 8, 1939 |
| 2,282,381 | Root | May 12, 1942 |
| 2,359,504 | Baldwin | Oct. 3, 1944 |
| 2,386,892 | Hadfield | Oct. 16, 1945 |
| 2,536,617 | Weller | Jan. 2, 1951 |
| 2,672,529 | Villard | Mar. 16, 1954 |
| 2,798,905 | Graham | July 9, 1957 |

OTHER REFERENCES

Terman text, "Radio Engineering," 3d ed., pages 367–368, pub. 1947 by McGraw-Hill Book Co., N.Y.